United States Patent [19]

Jones et al.

[11] Patent Number: 4,635,204

[45] Date of Patent: Jan. 6, 1987

[54] POSTAL METER WITH DATE CHECK REMINDER MEANS

[75] Inventors: Howell A. Jones, Southport; John H. Soderberg, Stratford; Alton B. Eckert, Norwalk, all of Conn.; Easwaran C. N. Nambudiri, Hicksville, N.Y.

[73] Assignee: Pitney Bowes Inc., Stamford, Conn.

[21] Appl. No.: 447,914

[22] Filed: Dec. 8, 1982

[51] Int. Cl.[4] .............................................. G06F 15/20

[52] U.S. Cl. ..................................... 364/464; 364/900

[58] Field of Search ................ 235/101; 340/712, 715, 340/815, 654; 364/464, 466, 900

[56] References Cited

U.S. PATENT DOCUMENTS

| | | | |
|---|---|---|---|
| 4,271,481 | 6/1981 | Check, Jr. et al. | 364/900 |
| 4,280,180 | 7/1981 | Eckert et al. | 364/900 X |
| 4,283,721 | 8/1981 | Eckert et al. | 340/825.36 X |
| 4,301,507 | 11/1981 | Soderberg et al. | 364/900 X |
| 4,302,821 | 11/1981 | Eckert et al. | 364/900 |
| 4,306,299 | 12/1981 | Check, Jr. et al. | 364/900 |
| 4,347,506 | 8/1982 | Duwel et al. | 364/900 X |
| 4,506,329 | 3/1985 | Duwel et al. | 364/464 |

*Primary Examiner*—Errol A. Krass
*Assistant Examiner*—Edward R. Cosimano
*Attorney, Agent, or Firm*—Donald P. Walker; Albert W. Scribner; William D. Soltow, Jr.

[57] ABSTRACT

In a postal meter adapted to be connected to a source of supply of power for energization, and having structures for printing postage values and a selected data, for displaying a plurality of segments, and for entering data, and having a computer electrically connected to each of the aforesaid structures and programmed for processing data for controlling the operation thereof, and wherein the postal meter includes structure for selecting one of a plurality of dates; there is provided an improvement for reminding an operator of the postal meter to check the selected date. The improvement includes the computer being programmed for causing the display to start displaying at least one unique segment in response to energization of the postal meter, the data entering structure including a depressable key for entering data into the computer, and the computer being programmed for causing the display to stop displaying the at least one segment in response to the depression of the key. In addition, the postal meter preferably includes the computer being programmed for disabling the printing structure in response to the energization of the postal meter, for causing the display to start displaying a postage setting in response to energization of the postal meter, for causing the display to start intermittently flashing the postage setting on display in response to energization of the postal meter, and for causing the display to stop intermittently flashing the postage setting on display in response to the depression of the key.

16 Claims, 11 Drawing Figures

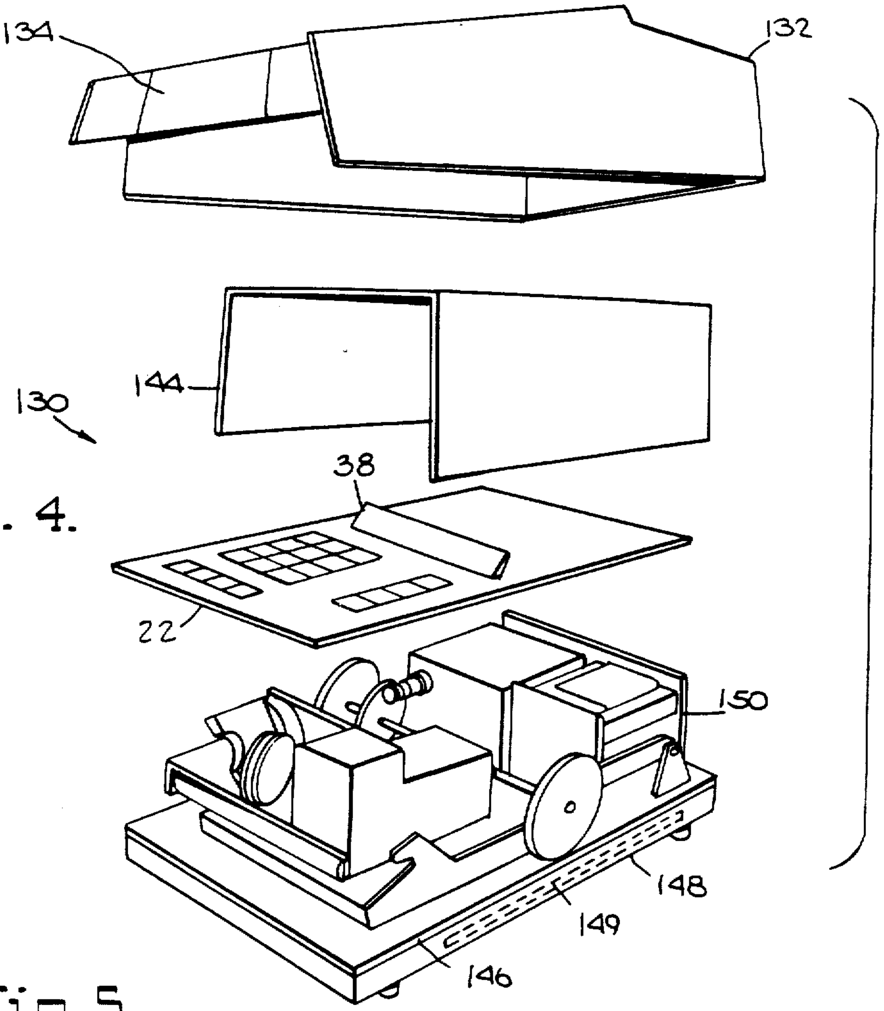
Fig. 4.
Fig. 5.
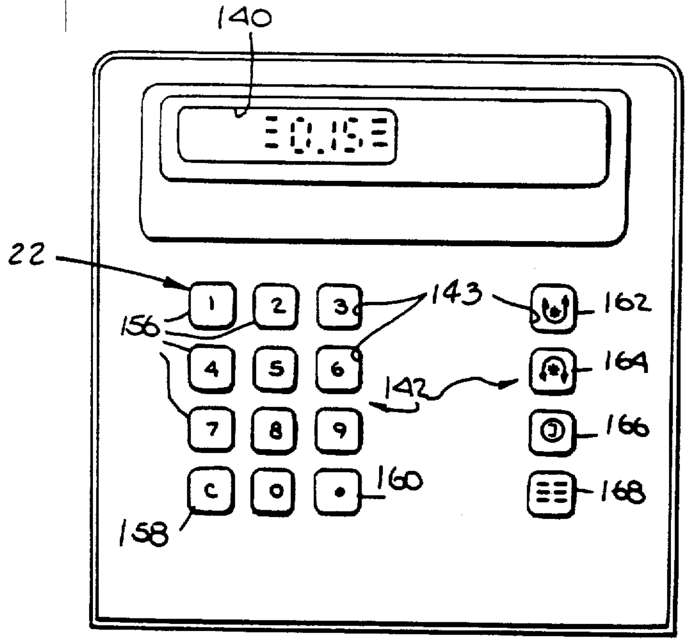

POSTAL METER WITH DATE CHECK REMINDER MEANS

BACKGROUND OF INVENTION

This application is related to U.S. application Ser. No. 447,815, now U.S. Pat. No. b 4,579,054, of D. P. Baun et al., for "Stand-Alone Electronic Mailing Machine", and to U.S. application Ser. No. 447,913, now abandoned, of A. B. Eckert, Jr. et. al., for "Initializing The Print Wheels In An Electronic Postage Meter"; both of which applications were filed concurrently herewith, are assigned to the assignee of the present invention and are hereby specifically incorporated herein by reference. In addition, this application is related to five additional concurrently filed co-pending patent applications, each of which is assigned to the assignee of the present invention, i.e., U.S. patent application Ser. No. 447,861, now U.S. Pat. No. 4,577,283, for Postage meter with keyboard keys for causing meter operations to be performed: Ser. No. 447,901, for Postage meter with keyboard keys for commanding and requesting performance of meter operations; Ser. No. 447,905, now U.S. Pat. No. 4,509,141, for Postage meter with keyboard keys used for changing operating constants; Ser. No. 447,870, now U.S. Pat. No. 4,535,407, for Postage meter with keyboard keys used for changing postage unused amount; and Ser. No. 447,919, for Postage meter with keyboard keys for causing display of data pertaining to meter operations.

Currently available electronic postal meters of, for example, the type disclosed in U.S. Pat. No. 4,301,507 for an Electronic Postage Meter Having Plural Computing Systems, issued Nov. 17, 1981 to J. H. Soderberg et al., and assigned to the assignee of the present invention, are generally provided with a keyboard for entering numerical postal values that are to be printed, a display for visually indicating the entered postage and other values, a printing mechanism and a micro-computer including accounting means and means for controlling the various functions of the postal meter.

In the aforesaid U.S. Pat. No. 4,301,507 the various components of the postal meter are compartmented according to their functions to form three units, referred to as the control, accounting and printing units. Each of the units incorporates a dedicated microprocessor having a separately controlled clock and programs. And, two-way communications are conducted via serial channels between the units, and via serial channels between the postage meter and any external apparatus connected to the meter, in the form of serially transmitted single byte "header" only messages, consisting of ten bits including a start bit followed by an 8 bit byte which is in turn followed by a stop bit, or in the form of a multi-byte message consisting of a header and one or more additional bytes of information. All transmitted messages are followed by a no error pulse if the echoplex message was received error free. In practice, each of the units is capable of processing data independently and asynchronously of the other. Further, to allow for compatibility between the postal meter and any external apparatus, all operational data transmitted to, from and between each of the three units and all stored operator information is accessible via the postal meter interface, as a result of which the external apparatus (if any) may be adapted to have complete control of the postal meter as well as access to all current operational information in the postal meter. In addition, the flow of messages to, from and between the three internal units is in a predetermined, hierarchical direction. For example, any command message from the control unit is communicated to the accounting unit, where it is processed either for local action in the accounting unit and/or for a command message in the printing unit. On the other hand, any message from the printing unit is communicated to the accounting unit, where it is either used for internal information or merged with additional data and communicated to the control unit. And, any message from the accounting unit is initially directed to the printing unit or to the control unit.

Some commerically available postal meters which utilize the aforesaid communication system have been provided with a mechanically operable field service switch which is operable to indicate to the meter that a service mode of operation of the meter is in effect in which various messages are given an alternate interpretation, for example, commanding or requesting the postal meter to display selected values stored in the postal meter. In this connection reference is made to U.S. Pat. No. 4,280,180 for an Electronic Postage Meter Having Field Resettable Control Values, issued to A. B. Eckert et al. and assigned to the assignee of the present invention. In U.S. Pat. No. 4,280,180, a second, key controlled, three-position, mechanical switch, is also provided, to permit an authorized user to initiate a series of routines allowing the user to recharge the postal meter with a predetermined amount of additional postage.

To that end, the positions of the three position switch are identified as the "operate", "enter amount" and "enter combination"positions. By positioning the three-position switch in either the "enter combination" or "enter amount" positions the operator may enter the combination or amount respectively into the meter via the keyboard. In each instance the entry results in providing an indication on the display of the entered amount or combination, as the case may be. Leaving each position generates a message causing the displayed value to be entered into the accounting unit and blanking the display for the next entry. Return of the three-position switch to the operate position in either instance causes the accounting unit to complete the recharging routine and return the meter to normal usage with the amount added to the postage unused register. In practise, the combination for this feature is obtained by calling a Data Center having information relevant to remotely enabling the resetting of the postal meter/-mailing machine for which the value is being modified, such as the Data Center of Pitney Bowes Inc. To obtain the combination the operator identifies the meter by serial number, and provides the Data Center with the code which is generated and displayed to the operator upon initially moving the key from the operate position, and also provides the value of the postage which the operator is desirous of adding to the postage unused register. Whereupon the Data Center provides the operator with a unique combination for use with the enter combination key, which combination is a random or pseudorandom number which changes with each resetting of the postage used register for security reasons.

Aside from the aforesaid usage, the three position switch is disclosed in U.S. Pat. No. 4,280,180 as being operable in combination with the service switch for changing certain other values stored in the meter, including a settable limit value, consisting of a predetermined maximum postage value which will not be printed if equaled or exceeded, a low postage warning value, consisting of a predetermined value which causes the postal meter to provide a visual indicator informing the user that the postal meter should be recharged, and a dollar unlock value, consisting of a predetermined postal value which will not be printed at any one time unless something is additionally done by the operator after the select postage key is initially actuated.

An object of the present invention is to provide a simply constructed, non-compartmentalized postal meter/mailing machine which includes a modified version of the aforesaid prior art communication system;

Another object is to provide a simply constructed non-compartmentalized, stand-alone, mailing machine which includes an electronically controlled postal meter incorporating a modified version of the aforesaid prior art communication system, and which includes improved means for servicing the mailing machine;

Another object is to provide an electronically controlled postal meter/mailing machine, having a keyboard, with means for entering and modifying various values in the same, including the serial number of the meter/machine via the keyboard; and A further object is to provide an electronically controlled postal meter/mailing machine including a communication system having a single micro-computer which is programmed so as to retain the hierarchical communication and serial message transmission features of the aforesaid prior art communication system for implementing the control, accounting and printing functions of the postal meter/mailing machine, and which includes improved means for informing the user that the date should be checked, invoking various routines for displaying information stored in the postal meter and changing selected values stored in the postal meter.

SUMMARY OF THE INVENTION

In a postal meter adapted to be connected to a source of supply of power for energization thereof and having means for printing postage values and a selected date, means for displaying a plurality of segments, means for entering data, computer means electrically connected to all of the aforesaid means and programmed for processing data for controlling the operation thereof, and having means for selecting a plurality of dates, there is provided an improvement for reminding an operator of the postal meter to check the selected date. The improvement comprises said computer means programmed for causing said displaying means to start displaying at least one unique segment in response to energization of said postal meter, said data entering means including a first depressable key for entering data into said computer means, and said computer means programmed for causing said displaying means to stop displaying said at least one segment on display in response to the depression of said first key. In addition, the postal meter is preferably provided with one or more of the following features. The computer means is programmed for disabling said printing means in response to the energization of said postal meter. The computer means is programmed for causing said displaying means to start displaying a postage setting comprising a plurality of segments in response to energization of said postal meter, and the computer means is programmed for causing said displaying means to start intermittently flashing said postage setting on display in response to energization of said postal meter. The computer means is programmed for causing said displaying means to stop intermittently flashing said postage setting on display in response to the depression of said first key.

BRIEF DESCRIPTION OF THE DRAWINGS

As shown in the drawings wherein like reference numerals designate like or corresponding parts throughout the several views:

FIG. 4 is an exploded view of the mailing machine of FIG. 3;

FIG. 5 is a plan view of the keyboard and display of the postal meter/mailing machine of FIG. 3;

DESCRIPTION OF THE PREFERRED EMBODIMENTS

Figure 1:
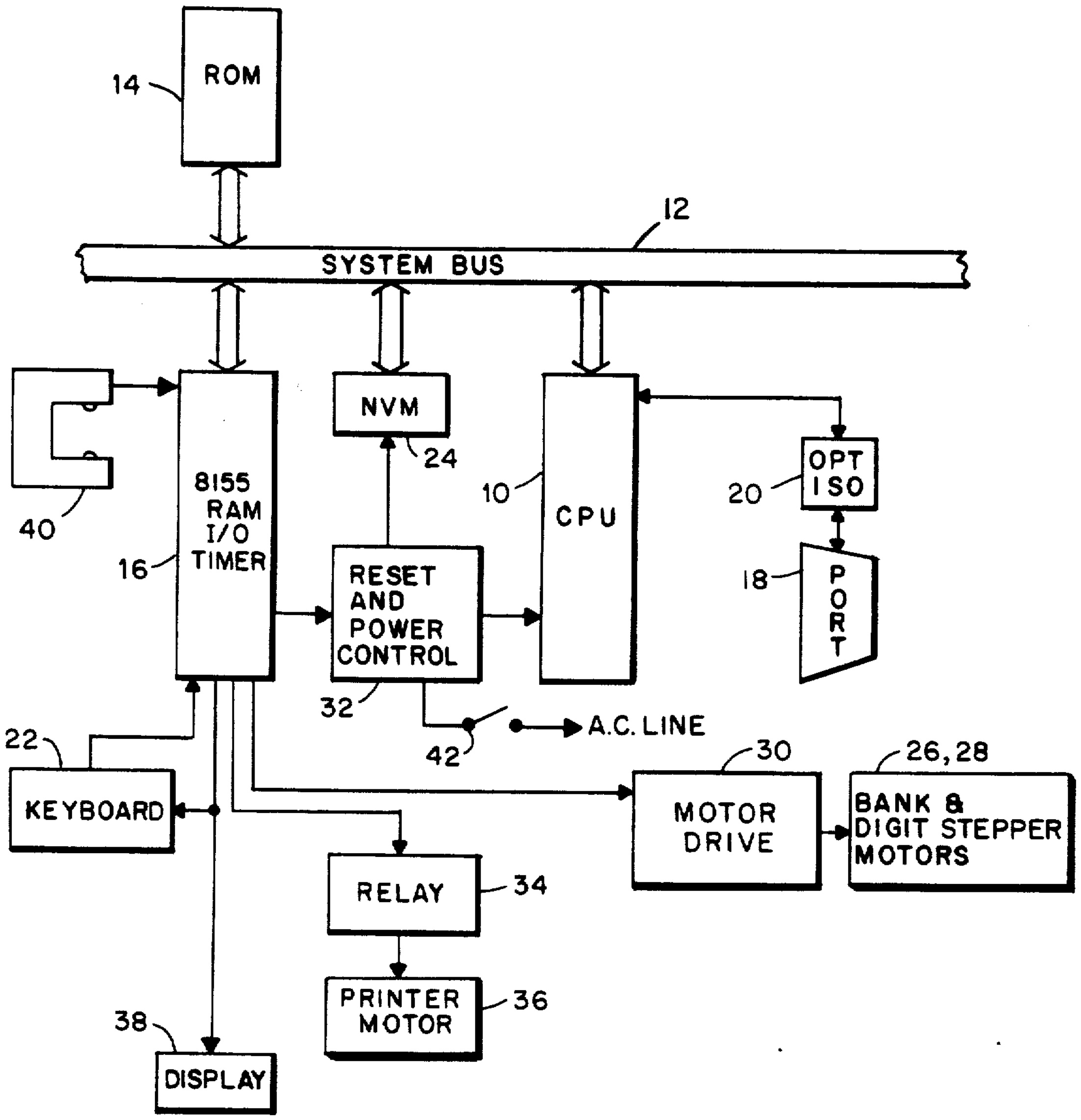
FIG. 1 is a block diagram of the electronic circuits of an electronic postage meter.

The electronic postal meter 130 (FIG. 3) includes an 8-bit microprocessor 10 (FIG. 1) (CPU), such as an Intel Model 8085A microprocessor which is connected to various electronically operable components through a system bus 12, including a ROM 14. The ROM 14, which is provided for storing the programs for controlling the postal meter, includes permanently programmed as well as reprogrammable devices. An integrated circuit 16, such as an Intel Model 8155, is connected to the system bus 12 and includes a RAM, input and output (I/O) lines and a timer. The RAM portion of the integrated circuit 16 has memory allocated for transient storage of the data for the ascending register and descending register. An external data communication port 18 which is connected to the microprocessor 10 through an optical isolator 20, allows for the connection to the postal meter of devices such as an electronic scale, external computer various types of servicing equipment and the like. Also electrically connected to the microprocessor 10 through the system bus 12 is the keyboard 22 of the postal meter and a non-volatile memory (NVM) 24. The bank and digit stepper motors 26, 28 of the postal meter are in electrical connection with the microprocessor 10 via a motor driver 30 and the integrated circuit 16. A reset and power control 32 is electrically connected between the integrated circuit 16, the NVM 24 and the microprocessor 10. A relay 34 connects the AC printer motor 36 to the integrated circuit 16. A display 38 is also electrically connected to the integrated circuit 16. Preferably the display 38 includes a plurality of, and preferably ten or less, seven segment (with decimal) digit display sections. And, for the purpose of this disclosure each decimal shall be considered to be a segment. And, a trip photosensor 40, which is connected to the microprocessor 10 through the integrated circuit 16, is provided for indicating the presence of an envelope to be imprinted, as described more fully in the aforementioned patent application entitled "Stand-Alone Electronic Mailing Machine".

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24. The non-volatile memory 24, which may be an MNOS semiconductor type memory, a battery augmented CMOS memory, core memory, or other suitable non-volatile memory component, stores critical postal meter data during periods when power is not applied to the postal meter. This data includes, in addition to the serial number of the mailing machine or postal meter, information as to the value in the descending register (the amount of postage available for printing), the value in the ascending register (the total amount of postage printed by the meter), and the value in the piece count register (the total number of cycles the meter has performed), as well as other types of data, such as trip status, initialization and service information, which are desired to be retained in the memory even though no power is applied to the postal meter.

When an on/off power switch 42 is turned on (closed) a power supply internal to the mailing machine energizes the microprocessor 10 and the balance of the electronic components. Whereupon information stored in the non-volatile memory 24 is copied into the RAM by the microprocessor 10. Accordingly, after power up the RAM contains an image or copy of the information which was stored only in the non-volatile memory 24 prior to energization. During operation of the postal meter, certain portions of the data in the RAM are ordinarily modified. For example, whenever postage is printed, the value stored in descending register will be reduced by the value of the printed postage, the value in the ascending register will be increased by the value of the printed postage and the value stored in the piece counter register will be incremented. When the power switch 42 is turned off (opened), the updated data reflecting such changed values in the RAM is transferred via the microprocessor 10 back into a suitably prepared area of the non-volatile memory 24. A like transfer of information between the non-volatile memory 24 and the RAM takes place during power failure.

Figure 2A:
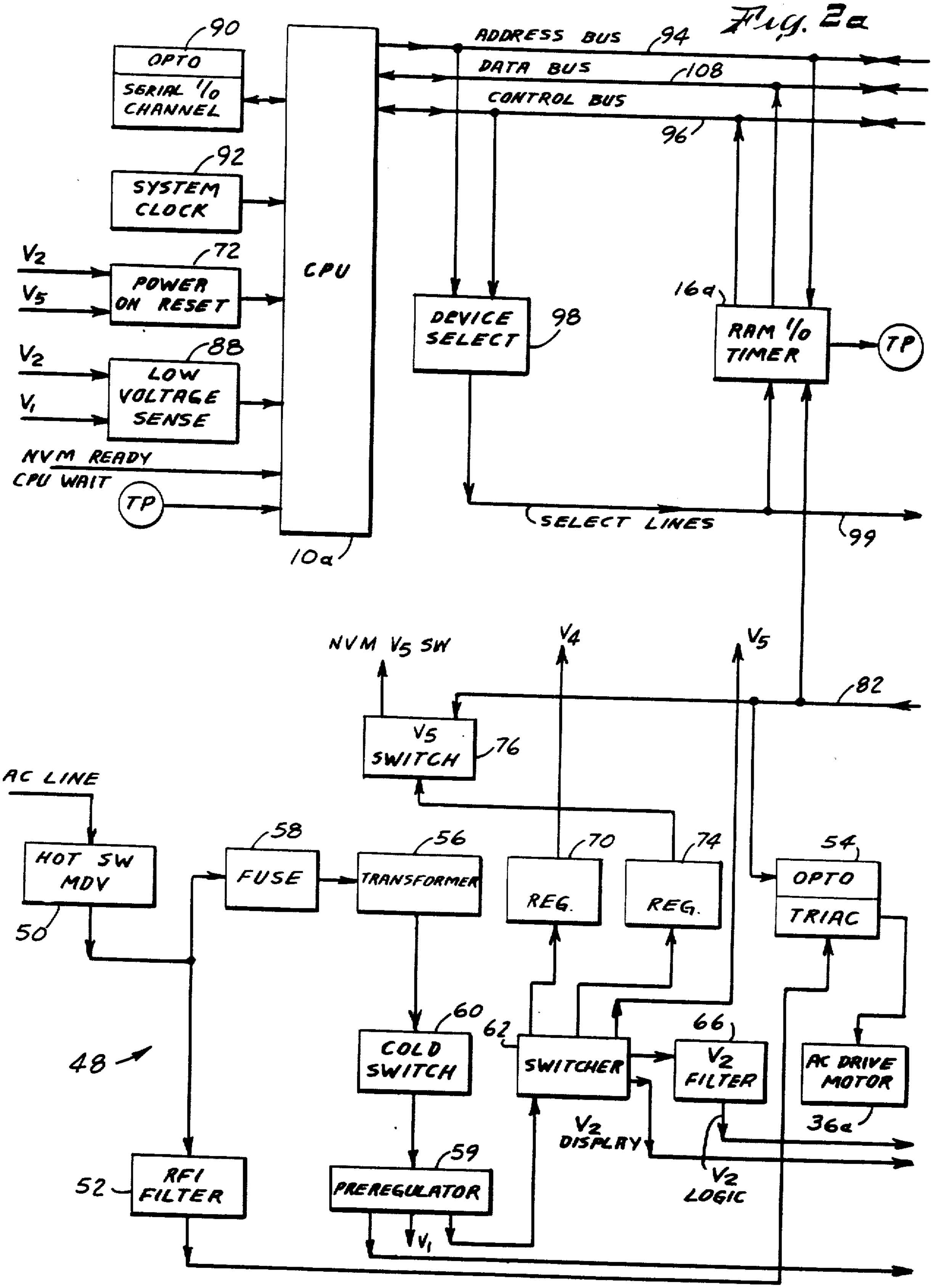
FIG. 2 (including FIGS. 2*a* and 2*b*) is a detailed block diagram of the electronic circuits of the electronic postage meter.
Figure 2B:
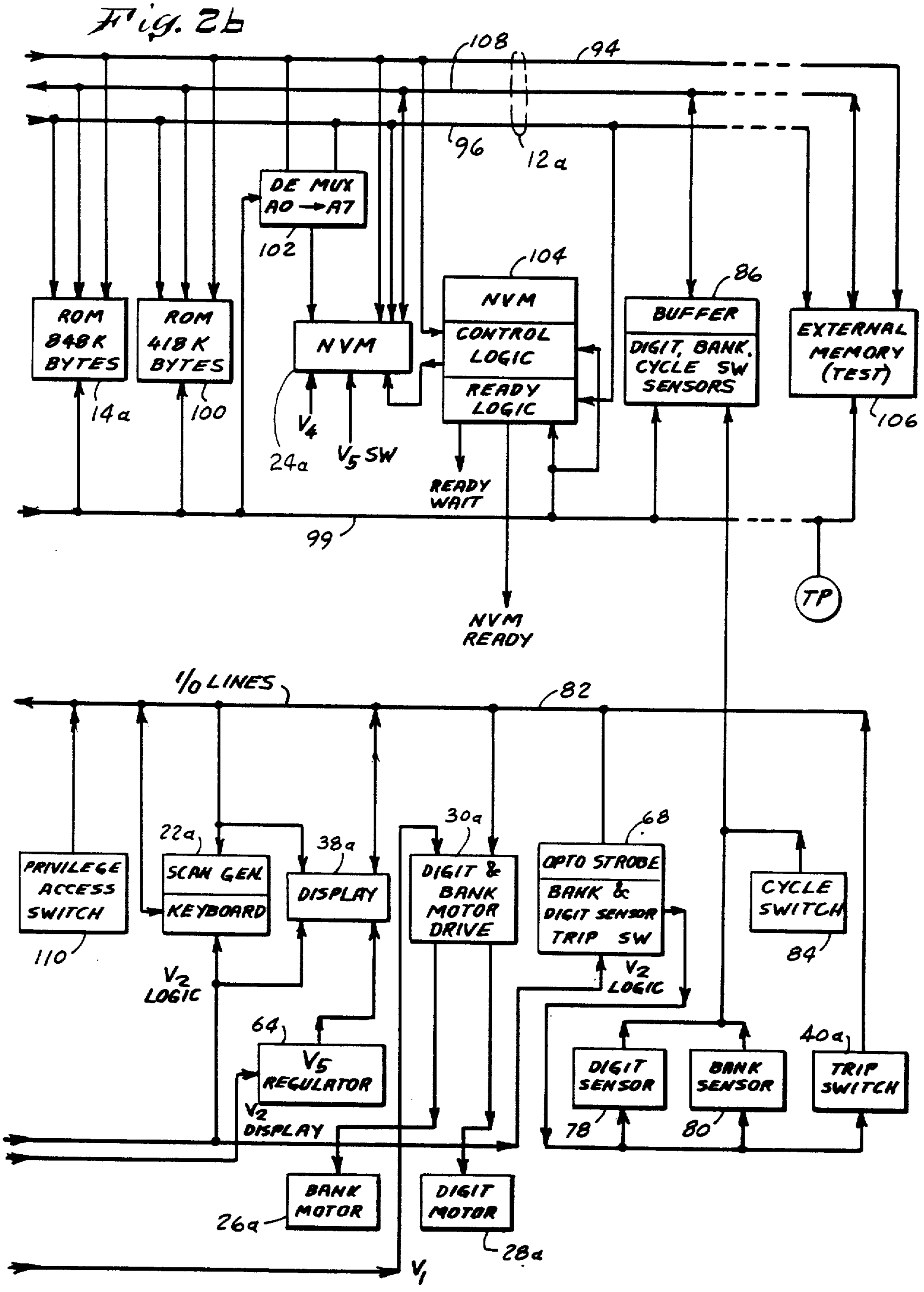

Referring to FIG. 2, a more detailed block diagram of the arrangement of the electrical components of the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises above a preset limit, nominally 70° C. The hot switch 50 is connected to the AC drive motor 36A through an RF filter 52 and an opto-triac 54 which provides isolation between the line voltage and the control logic for the meter. The hot switch 50 is also suitably connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5 V; and the voltages for generating −12 V and −30 V.

The +5 V is applied to a +3 volt regulator 64 and then to the display 38A. The +5 V from the switcher 62 is also applied to a +5 V filter 66 which provides +5 V for logic circuits. Specifically, the +5 V is applied to the keyboard 22A, the display board 38A, and bank, digit and trip sensor logic 68 and to the integrated circuits. The −12 V is applied to a −12 V regulator 70 and then to the non-volatile memory 24A.

The −30 V output from the switcher 62 is also applied to a −30 V regulator 74 and then to a −30 V switch 76 which switches its output voltage on and off in response to the requirements of writing in NVM as dictated by a program. The output of the −30 V switch is applied to the non-volatile memory 24A. The −30 V supply is connected to the power on reset 72 of the microprocessor 10A.

+5 V from the switcher 62 is also supplied to one input of the power on reset 72; the other input receives −30 V from the regulator 74 as previously described. A low voltage sensor 88 also receives one input of +5 V from the switcher 62 and its other input from the pre-regulator 59 the output of the voltage sensor 88 is applied to the microprocessor 10A. Upon applying the aforesaid voltages to the microprocessor 10A, the microprocessor system clock 92 is energized. Communications between the microprocessor 10A and the outside world are conducted via the optically isolated serial input and output channels 90. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the from of +24 V is applied to the digit and bank motor drive 30A for the bank motor 26A and digit motor 28A, which respectively select the particular printing wheel (bank) which is to be activated and the particular digit of the selected printing wheel which is to be set.

An output strobe from the integrated circuit 16A is buffered the bank, digit and trip sensor logic 68 and applied to a digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86.

During power up, the key switch 42 (FIG. 1) is closed, and the AC line voltage energizes the electrical components previously described and an Initialization process will occur. Such initialization may include a hard and/or soft initialization process as disclosed in the aforementioned U.S. Pat. No. 4,301,507. Preferably the initialization process for the mechanical components of the meter/machine is as disclosed in the aforementioned patent application entitled "Initializing The Print Wheels In An Electronic Postage Meter".

In operation, the microprocessor 10A under control of the ROM 14A and possibly the auxiliary ROM 100 communicates over the address bus 94 and control bus 96 with the device select 98. The output of the device select 98 communicates with the particular component to be addressed over select lines 99, including the RAM, the ROM 14A, an auxiliary ROM 100, a demultiplexer 102, NVM logic 104 and the buffer 86. The RAM of integrated circuit 16A provides the working memory for the postage meter and the microprocessor 10A. The ROM 14A stores the program; the auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready, wait and NVM ready signals to the microprocessor 10A to indicate the presence of the slow speed device (NVM) as active on the bus 12A.

As previously mentioned, the digital sensor 78 (optical encoder) and bank sensor 80 (optical encoder) and cycle switch 84 whose current state is read, i.e., "Home" or "In Cycle", apply input signals to the buffer 86 which sends output signals over data bus 108 to the microprocessor 10A for storage in the proper RAM location.

The RAM is also electrically coupled to the I/O lines to transmit receive data from the trip sensor 40A, the display 38A, keyboard 22A, and, if present, a privileged access switch 110 which is kept under seal. The switch 110 is provided for use in applications which require manual resetting of meter postage by authorized personnel of, for example, the Postal Service.

Figure 3:
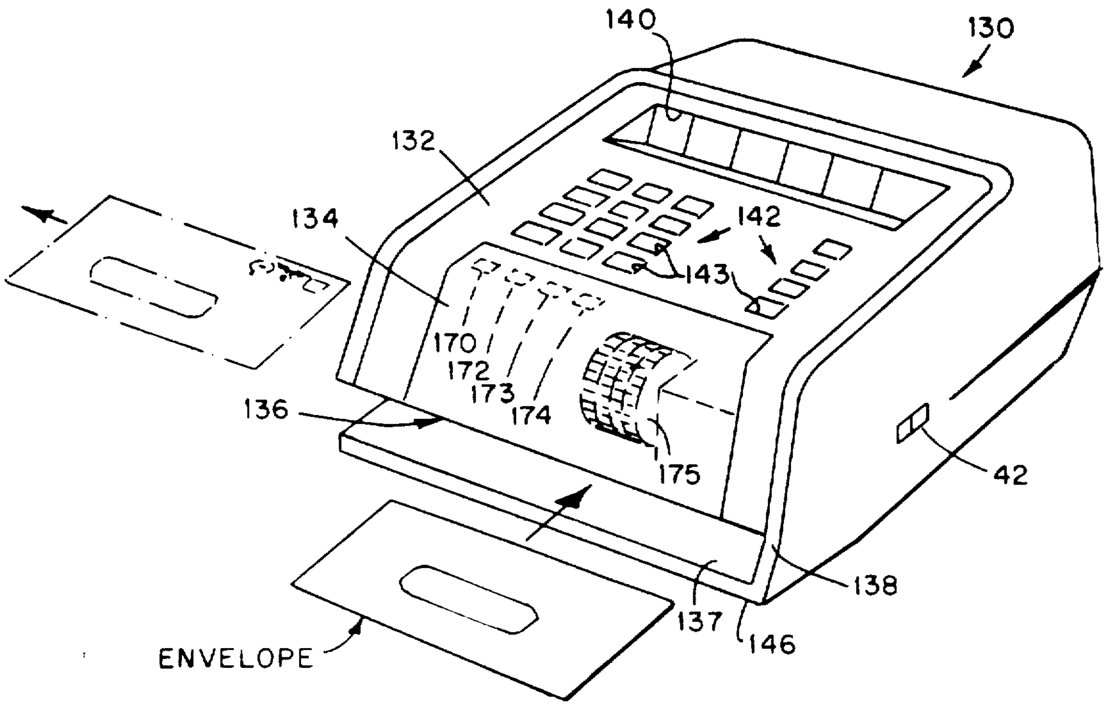
FIG. 3 is a front perspective view of a mailing machine, including a postal meter, which incorporates the features of the present invention.

As shown in FIG. 3, a mailing machine 130 adapted to house the aforesaid electronic postal meter includes a cover 132 having a hinged lid 134, and a slot 136 therein with a closed end 138 at the right hand side thereof. A portion of the slot 136 forms a deck 137 on which an envelope is placed when inserted into the slot 136 for printing postage thereon. At the top of the cover 132 is an opening 140, and a control panel 142 having a plurality of openings 143 formed therein. The cover 132 (FIG. 4) has nested therein an electromagnetic insulating shield 144. The cover 132 and shield 144 are attached to a base 146; the cover 132 and base 146 together forming a housing. Depending from the base 146 is a pan 148 that contains a logic board 149. A power supply board 150 is mounted on the base 146. The display 38 and the keyboard 22 are conventionally supported within the housing, with the display 38 aligned with the opening 140 in the cover 132. The keyboard 22 (FIG. 5), which serves as an information inputting and information retrieval device, has a plurality of keys which extend through the openings 143 of the control panel 142 for access by the operator. Such keys include the numeric setting keys 156 numbered 0–9, a clear key 158, a decimal key 160, a postage used key 162, a postage unused key 164, a piece count key 166 and a select postage key 168. In addition, towards the front of the mailing machine 130 (FIG. 3), located under the lid 134, are a plurality of special purpose keys of the keyboard 22. Such keys including an access code key 170, an enter amount key 172, an enter combination key 173 and a date key 174. Also located under the lid 134 are a plurality of thumbwheels 175 which are mechanically connected to the date printing mechanism for adjustment thereof as described more fully in the aforementioned application entitled "Stand-Alone Electronic Mailing Machine". Preferably the keys of the keyboard 22 are membrane switches.

In general, the electronic communication system of the postal meter is in many respects the same as the system disclosed in the aforesaid U.S. Pat. No. 4,301,507. In this connection it is noted that the software architecture of the communication system disclosed in U.S. Pat. No. 4,301,507 services three separately compartmented units of electronic structure, referred to as the control unit, accounting unit and printing unit. Each of such units includes a dedicated central processing unit connected by way of conventional data lines, control lines and address lines to, in the case of the control unit, a multipurpose conventional RAM/ROM/I/O timer circuit incorporating timing control elements and input/output interface hardware, in the case of the accounting unit, a conventional EAROM and a plurality of PROMs incorporating timing control elements and input/output interface hardware, and, in the case of the printing unit, conventional buffers, timing control elements and input/output interface hardware. And, communications between the three units are conducted via serial channels connected between the respective microprocessors of the control, accounting and printing units.

In the postal meter/mailing machine disclosed herein the functionally comparable units of electronic structure, although not compartmented from each other are treated and function as separate and independent structures. And, although a single microprocessor 10 is used, the ROM 14 is organized for storing three substantially independently functioning sets of routines, one for each of the control, accounting and printing functions. Further, although the serial channel communication lines between the compartmented units of the prior art have been eliminated, the RAM of the integrated circuit 16 includes dedicated control, accounting and printing registers for communication between the three functional modules, and includes dedicated buffers for communications with external devices. Accordingly, information is communicated in message form between the three functional modules and between the mailing machine 130 and any external device connected to the external ports 18. Aside from the foregoing, since the three crystal controlled clocks used in the compartmented units of the prior art communication system have been replaced in the present communication system with a single .crystal controlled clock, the three functional modules of the present communications system are no longer internally asynchronously operable. Rather the control, accounting and printing routines are independently selected under the control of a single idle loop program stored in the ROM 14. On the other hand, as in the prior art communication system processing precedence is given to messages and requests received from external devices, over those that are internally generated for processing. Thus, as in the prior art, the external device may, as a general rule, take control of the operation of the postal meter/mailing machine. In addition, as a general rule, once the processing of a message has been commenced, such processing will proceed to completion. For example, when printing cycle has been commenced, by tripping the postal meter/mailing machine, nothing is permitted to interrupt the completion of the postage printing cycle and processing the postage value associated therewith under the control of the selected accounting routines.

In addition to the above referred to circuits of the control structure, the control structure includes the circuits of the integrated circuit 16. The control routines utilize two buffers in the RAM, one in which messages corresponding to the digits of the display are built and stored, and the other in which a bit for bit copy or image of displayed digits is stored. As information is entered into the keyboard 22 by depressing one or more keys, a copy of such information in numerical message format is built in the display buffer and transferred in bit format to the image buffer for driving the display. When the postal meter responds to any message from the keyboard 22, the response is communicated to the external device from the transmit buffer. And, with the exception of status responses any message stored in the transmit buffer is copied from the transmit buffer into the display buffer. On the other hand, when the postal meter responds to messages from the external device the responses are only communicated to the external device. Such messages are not displayed, with the exception of postal value messages which are copied into the display buffer as well as being communicated to the external device. Thus the display is mainly used for displaying responses to entries from the keyboard 22. And the keyboard 22 is utilized for inputting information to the microprocessor 10, which interprets each switch closure and in response thereto drives the display 38.

As is hereinafter more fully discussed, for reminding the user to adjust the date by manipulating the thumbwheels 175, the control structure is responsive to the application of power via the power supply board 150 to the mailing machine 130, for selectively energizing the LED display to visually display a predetermined code, which is preferably a single segment in the middle, or minus sign position, in the extreme left digit position of the LED display, and to concurrently intermittently flash the entire display until the lid 134 is opened and the date key 174 depressed.

Further, the control structure is selectively responsive to utilization of the appropriate numerical keys 156 in combination with the access code key 170 for generating command and request messages for which separate keys have not been provided, for example a command to enter or exit the service mode.

In addition, in the service mode of operation the control structure is selectively responsive to utilization of the remote resetting keys, including the enter amount key 172 and enter combination key 173, for generating data entry messages which invoke various accounting routines for modifying values stored in the RAM to conform to customer requests, for example, for modifying the settable limit value, low postage warning value and dollar unlock value. In addition, in the service mode of operation provision is made for modifying the serial number of the postal meter if it is stored in the postal meter in modifiable form.

Further, in the non-service mode of operation the control structure is selectively responsive to utilization of the access code key 170, enter amount key 172 and enter combination key 173 for generating data entry messages which invoke various accounting routines for, in the case of the access code key 170, displaying an access code which is used by the operator for calling into a Data Center to obtain a combination code, and in the case of the enter amount and enter combination keys, 172 and 173, for modifying (normally increasing) the postage unused value stored in the RAM to permit the postal meter to print additional postage.

In addition to the above referred to circuits thereof, the accounting structure includes the non-volatile memory 24 for storing critical data, including the serial number, current values in the ascending and descending and piece count registers. The accounting structures also includes volatile memories, including a plurality of registers in the RAM which function as working ascending, descending and piece count registers for storing total amounts that are appropriately adjusted whenever postage is printed or the remote resetting function keys are utilized. The working volatile memories store such critical operational data for current use and transfer the same to the non-volatile memory 24 at such time as a reduction in power is sensed or the main power switch 42 is moved to its off position.

In addition to the above referred to circuits thereof, the printing structure includes the circuits of the optical sensors, 78 and 80, which are respectively associated with the digit and bank selector stepper motors 28 and 26, respectively, for sensing the relative positioning of the print wheels of the postal meter. And the printing structure also includes the circuits of the photosensor 40 associated with the trip lever for sensing the movement of the lever in response to appropriate insertion of an envelope into the mailing machine slot 136 as discussed more fully in the aforesaid patent application entitled "Stand-Alone Electronic Mailing Machine".

Assuming initialization of the postal meter has been completed for example as disclosed in U.S. Pat. No. 4,301,507 and in U.S. Application Ser. No. 447,913, now abandoned, of A. B. Eckert et al., for "Initializing The Print Wheels In An Electronic Postage Meter", the microprocessor 10 executes a scan routine under the control of the idle loop program. The scan routine continuously searches the keyboard 22 for key closures resulting from depression of keys. When each key is depressed, thereby closing the associated switch, the microprocessor 10 executes a control routine which causes a subroutine stored in the control structure to drive the LED display in response to such key depressions. Upon turning the power switch to its "on" position 600 (FIG. 6), the postal meter/mailing machine flags the date key as not checked 602. Thereafter, in the course of the initialization process, a zero postal value is displayed and flagged as a postage setting being on display 604. Whereupon, according to the invention, the date check logic routine of FIG. 6 is invoked.

Figure 6A:
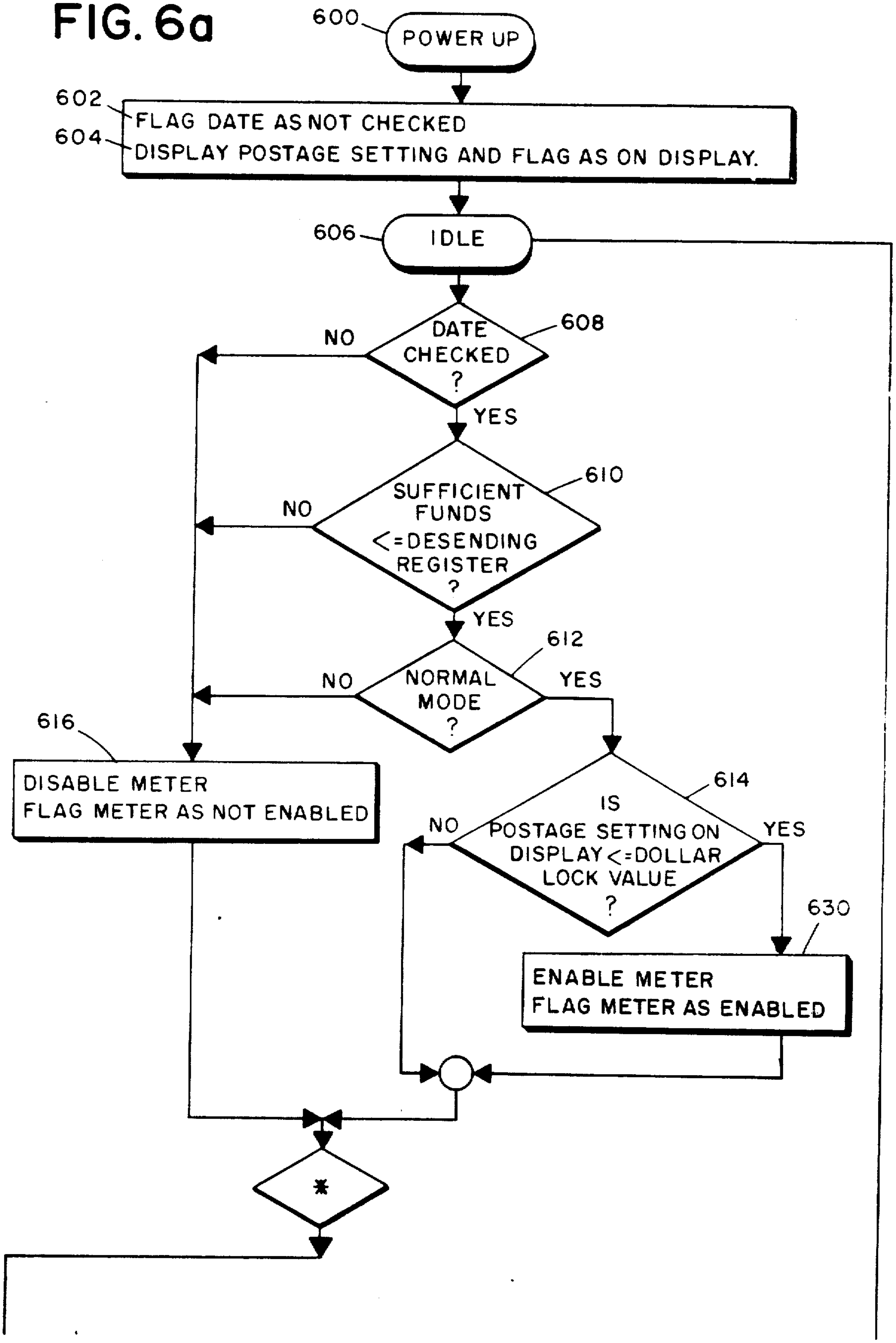
FIG. 6 (including FIGS. 6*a* and 6*b*) is a flow chart of the date check logic routine according to the invention.
Figure 6B:
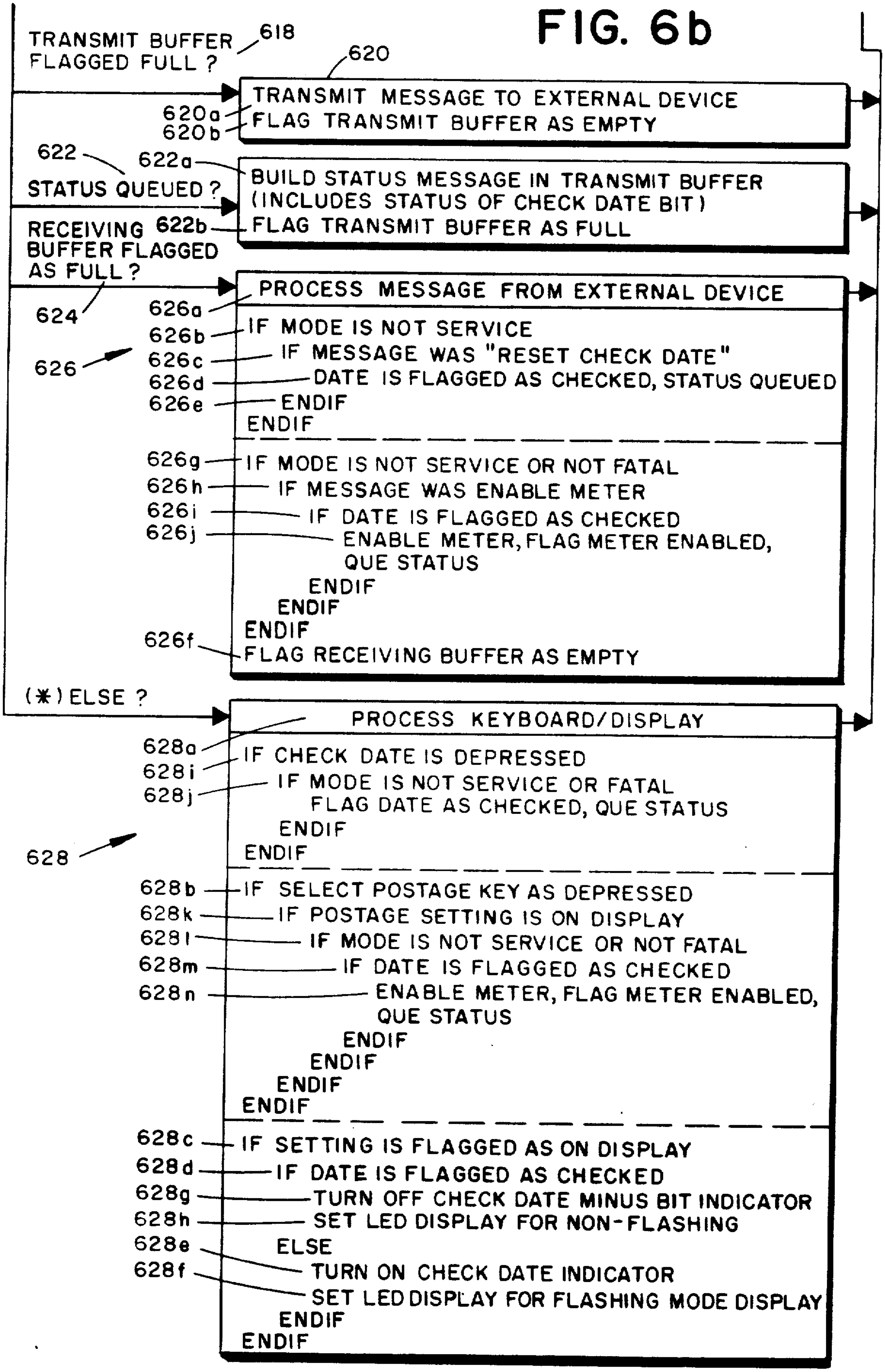

As shown in FIG. 6, wherein the 600 series of numbers is utilized to identify steps of the process shown therein, the microprocessor executes the program starting from idle 606, commencing with a determination as to whether or not the date has been checked 608. If it is not, the postal meter is disabled 616 and flagged as such, as a result of which the postal meter cannot print postage. If it were, determinations would also be made as to whether or not sufficient funds are available in the meter to print the displayed value 610, whether or not the postal meter is in the normal mode of operation 612, and whether or not the dollar unlock value stored in the meter is greater than the postage value which is displayed 614. Thus, if any one of these first three questions, 608, 610, 612, is answered in the negative, the postal meter is disabled 616 and flagged as such. On the other hand, if all of the first three questions, 608, 610 and 612, are answered in the affirmative, a determination is made as to whether or not the dollar unlock value is equalled or exceeded by the postage setting on display 614. If the dollar unlock value has not been equalled or exceeded the postage meter is enabled 630 and flagged as such, otherwise it is not; and, thereafter, in both instances, the transmit buffer 618, receiving buffer 624 and keyboard/display buffer/flags 628 are scanned for processing. For the purpose of this discussion, until otherwise stated, it will be assumed that the postage setting on display remains at the zero value displayed in the course of the initialization process, as a result of which the postage setting is less than the dollar unlock value 614. In addition it will be assumed that there are sufficient funds 610 and that the mode is normal 612.

As shown in FIG. 6, the remainder of the organization of the check date logic routine calls for processing precedence to be given in turn to transmitting messages to the external device which are stored in the transmit buffer 618, then to processing messages generated by the external device and stored in the receiving buffer 624 and then to processing messages generated by the keyboard 628. Before discussing the same in greater detail, there follows a general discussion of such processing steps.

The transmit buffer is initially scanned to determine whether it is full or empty 618. If it is full, then, as shown in the first block 620, the message stored in the transmit buffer is transmitted to the external device 620*a*, the transmit buffer is flagged as empty 620*b* and processing returns to idle 606. Thereafter the microprocessor scans the various flags to determine whether status information has been queued 622, that is, has been flagged to indicate that it is information which is to be transmitted to the external device. If status has been queued, a message corresponding to the status of the postage meter is built in the transmit buffer 622*a*, for example a message including a bit which indicates the status of the date as not being checked, and the transmit buffer is flagged as full 622*b*. Whereupon processing returns to idle 606. On the next scan, since the transmit buffer is now flagged as full 618, the message stored in the transmit buffer is transmitted to the external device 620*a* and the transmit buffer is again flagged as empty 620*b* and processing returns to idle 606. The aforesaid processing continues until all of the queue flags have resulted in a message being transmitted to the external device, one for each such queue flags. At this juncture, the transmit buffer having been flagged as empty, is available for filling with subsequent data to be transmitted, and processing returns to idle 606.

If on the next scan the receiving buffer is flagged as full 624, the check date message stored therein is procesed provided the postal meter is not in the service mode of operation 626*b*, 626*g*. Date check processing does not occur in the service mode because the postal meter is not equipped to process and account for printed postage when it is in the service mode. Also, in the case of a meter enable message being processed 626*h*, processing is ended if the meter is in the fatal mode of operation. This occurs when, for example, the meter has experienced a malfunction requiring the attention of a qualified serviceman. If the receiving buffer is flagged as empty 624, processing occurs in the fourth block 628, wherein keyboard generated messages 628*a*, pertaining to the postage setting being on display 628*c*, are processed.

Referring now to the date check query 608, and assuming that the date is not checked, the meter is disabled 616 and flagged as such. Thereafter assuming the transmit buffer 618 and receive buffer 624 are both flagged as empty, processing occurs in the fourth block 628. If none of the keys 628*a* or 628*b* have been depressed, since the postage setting (zero value) is still flagged as on display 628*c* (from 604) and the date is still flagged as checked 628*d* (from 602), the check date indicator, preferably a minus sign in the extreme left digit position of the LED display, is turned on 628*e* and the entire LED display is set to a flashing mode of operation 628*f*. Thus the keyboard operator is visually reminded to check the setting of the thumbwheels 175 (FIG. 3). In addition, status is queued, 628*f*, 622 (FIG. 6) and processed as hereinbefore discussed in the case of an external device being utilized to operate the postal meter.

Assuming the postal meter is being operated from the keyboard, the operator would at this juncture check the setting of the date and change the same, if necessary, by manipulating the thumbwheels 175 (FIG. 3). Thereafter, the operator would depress the date key 174. Upon doing so, the date will not as yet have been checked 608 (FIG. 6). Accordingly, the meter would remain disabled 616 and flagged as such. On the other hand, since the transmit buffer is flagged as empty 618, the receiving buffer flagged as empty 624 and the check date key has been depressed 628*a*, the date is then flagged as checked 628*i*. In addition, since the postage setting is still on display 628*c* and the date flagged as checked 628*d*, the minus bit indicator is turned off 628*g*, the LED display set to its non-flashing mode 628*h*, and processing returned to idle 606. At this juncture since the date has now been flagged as checked 608 (from 628*j*), and the answer to the questions 610, 612 and 614 are all yes, the meter is enabled and flagged as such.

Assuming the postal meter is being operated from an external device, the external device would normally be operated to generate and transmit to the postal meter a "reset check date" message, i.e., a header only message which simulates the depression of the date key of the postal meter. Assuming this has occurred, the transmit buffer is flagged as full 624, and the message from the external device is processed 626*a* . Since the postal meter is not in the service mode 626*b*, if the message was not "reset check date" processing would be ended 628*e*, but since the message was "reset check date" 626*c*, the date is flagged as checked 626*d*, the receiving buffer is flagged as empty 626*f* and processing returned to idle 606. Since the date has now been flagged as checked 608 (from 626*d*), and the questions 610, 612 and 614 are all answered affirmatively, the meter is enabled and flagged as such. Thereafter, all queued status is processed as hereinbefore discussed and transmitted to the external device. Then, since the date is flagged as checked (from 626*d*) and the setting is still flagged as on display 628*c*, the check date minus bit indicator is turned off 628*g*, the LED display set for the non-flashing mode 628*h*, and processing returned to idle 606.

As shown in FIG. 6, the external device can enable the meter 626*j* by transmitting an enable meter message to the postal meter. Assuming this occurs and the postage setting on display 614 is greater than the dollar unlock value, the receiving buffer will be flagged as full 624 and the message therein processed in block 626. Whereupon if the mode is not service or not fatal 626*g* and the date is flagged as checked 626*i*, the enabled meter message will be processed, preferably, on an unconditional basis. However it is within the scope of the invention to conditionally enable the meter 626*j*. This may be deemed to be a desirable occurrence due to it being generally impermissable to unconditionally enable the meter 626*j* when the postage value on display exceeds the dollar unlock value 614. For example, it may be desirable that the processing step 626*j* include a conventional subroutine to permit enablement of the postal meter by the external device when the enable meter message **626*h*** simulates more than one discrete depression of the select postage key.

Similarly, the postal meter may be enabled from the keyboard by depressing the select postage key **628*b*. Again, assuming the postage is on display 628*k*, the mode not service or not fatal 628*l* and the date flagged as checked 628*m*, the meter will be, preferably, unconditionally enabled. However, as hereinbefore discussed it may be desirable to conditionally enable the postage meter, for example if the postage setting on display exceeds the dollar lock value. Thus the remarks hereinbefore made with regard to processing at step 626*j* apply with equal force to the processing at step 628*n*, except that meter enablement would occur, for example, when the select postage key 628*b*** is actually depressed a second time.

Aside from the foregoing, if the date has been checked 608 but there are insufficient funds in the postal meter to print the displayed postage 610, the meter will be disabled 616 and flagged as such. Reading down the flow chart (FIG. 6) it will be noted that nothing in chart can cure this problem, as a result of which processing is ended and returns to idle 606. Ordinarily the operator would at this juncture recharge the meter.

If the date has been checked 608 and there are sufficient funds 610 but the meter is not in the normal mode 612, then, the meter will be disabled and flagged as such, processing ended and returned to idle 606 since there is nothing in the flow chart (FIG. 6) for curing this problem. Ordinarily, if the meter is in the service mode, the operator would have to take it out of the service mode before proceeding with check date processing. On the other hand, if the meter were not in the service mode but was in the fatal mode, the user would ordinarily call a serviceman to cure the problem.

Assuming that the problems which could occur with respect to insufficient funds 610 or not being in the normal mode 612, are cured, it will then be assumed that the date is checked 608, but the setting on display is less than the dollar lock value 614, as a result of which nothing is done. However, this state of affairs can be dealt with as hereinbefore discussed by the check date logic routine. Since the date was checked 608 at the outset, the operator can operate the select postage key **628*b* to depress the same a second time for overriding the dollar unlock feature of the postal meter. And, upon doing so, since the setting is on display 628*k*, the mode of operation is normal 628, and the date was flagged as checked 628*m*, the meter is enabled 628*n* to print postage. After which, processing is ended and returns to idle 606**.

Accordingly, when the postal meter/machine is powered-up, the date is flagged as not checked, as a result of which the check date program is invoked and executed by the microprocessor to determine whether or not a postage setting is on display and, if it is and the date is not checked, the microprocessor disables the meter to prevent postage from being printed. In addition, the display is then driven to display at least one segment in a predetermined digit position of the display. In the preferred embodiment, a minus sign is displayed in the extreme left digit position. In addition, the entire LED display commences flashing, intermittently, to inform the user that the date has not been checked. Further, the postal meter/machine is programmed to respond to depression of the date key to turn off the minus sign bit in the extreme left hand digit position of the LED display and set the LED display to a non-flashing mode. In addition, the postal meter/machine is programmed to respond to messages from an external device for simulating depression of the date key and for enabling the meter/machine without operator intervention. Further, the postal meter is programmed to permit utilization of the select postage key for generating an enable meter message after the date has been checked although the postage setting on display exceeds the dollar unlock value; and provision is made to permit an external device to simulate such operation of the postage meter.

Referring now to FIG. 5, in any mode of meter operation other than the service mode, depression of the postage used key 162 effects the display at the display panel 140 of the total value in the ascending register of all postage that has been printed, depression of the postage unused key 164 effects the display of the total value in the descending register of the postage then available for printing, and depression of the piece count key 166 effects the display of the total count of all printing operations of the mailing machine 130. In each instance the depression of the selected key results in the current value associated with the key being displayed for a predetermined time interval after the key is released, for example several seconds, after which time interval the display will return to the then current postage setting.

According to the invention, the numerical keys 156 (FIG. 5) in combination with the access code key 170 (FIG. 3) may be used for displaying the aforesaid information and other information which is not ordinarily the kind of information that a customer needs or is able to interpret. And, when the meter is in the service mode of operation, the postage used, postage unused and piece count keys, 162, 164 and 166 (FIG. 5) may each be used to effectuate the display of some of such other information. The latter case is hereinafter initially discussed since it exemplifies both usages of the keyboard.

In order to effectuate utilization of the keyboard 22 (FIG. 4) to initiate command or request functions for which separate keys have not been provided, a predetermined numerical code, having at least two and preferably four characters without a decimal, is entered in the keyboard 22 by depressing the appropriate numerical keys 156 (FIG. 5), followed by depression of the access code key 170 (FIG. 3). Upon depression of the access code key 70 a control routine is invoked which causes the generation of a request or command header corresponding to the two low order digits in the display. For example, although a service mode key has not been provided, entering the numerals 6946 in the keyboard followed by depression of the access code key 170 will cause the generation of a "46" command header. Whereupon the microprocessor will invoke a conventional subroutine causing the meter to enter the service mode of operation. When this occurs, a predetermined code, preferably consisting of a segment inserted in the low segment position of each blank digit position will be displayed to inform the user that the postal meter and thus the machine is in the service mode of operation. Thereafter, depression of the postage used key 162 will result in the display of the "dollar unlock" value, consisting of a predetermined value which if equaled or exceeded, in the course of use of the postal meter, will not be printed unless the operator depresses the select postage key a second time after the value is originally displayed. On the other hand, in the service mode of operation, the depression of the postage unused key 164 will result in the display of the "low postage warning" value, consisting of a predetermined postage value which results in the display of a warning signal informing the operator that the postal meter/mailing machine should be recharged. And, depression of the piece count key 166 will result in a diagnostic status display identifying the last fatal condition that occurred, even though that condition was subsequently cleared.

Figure 7:
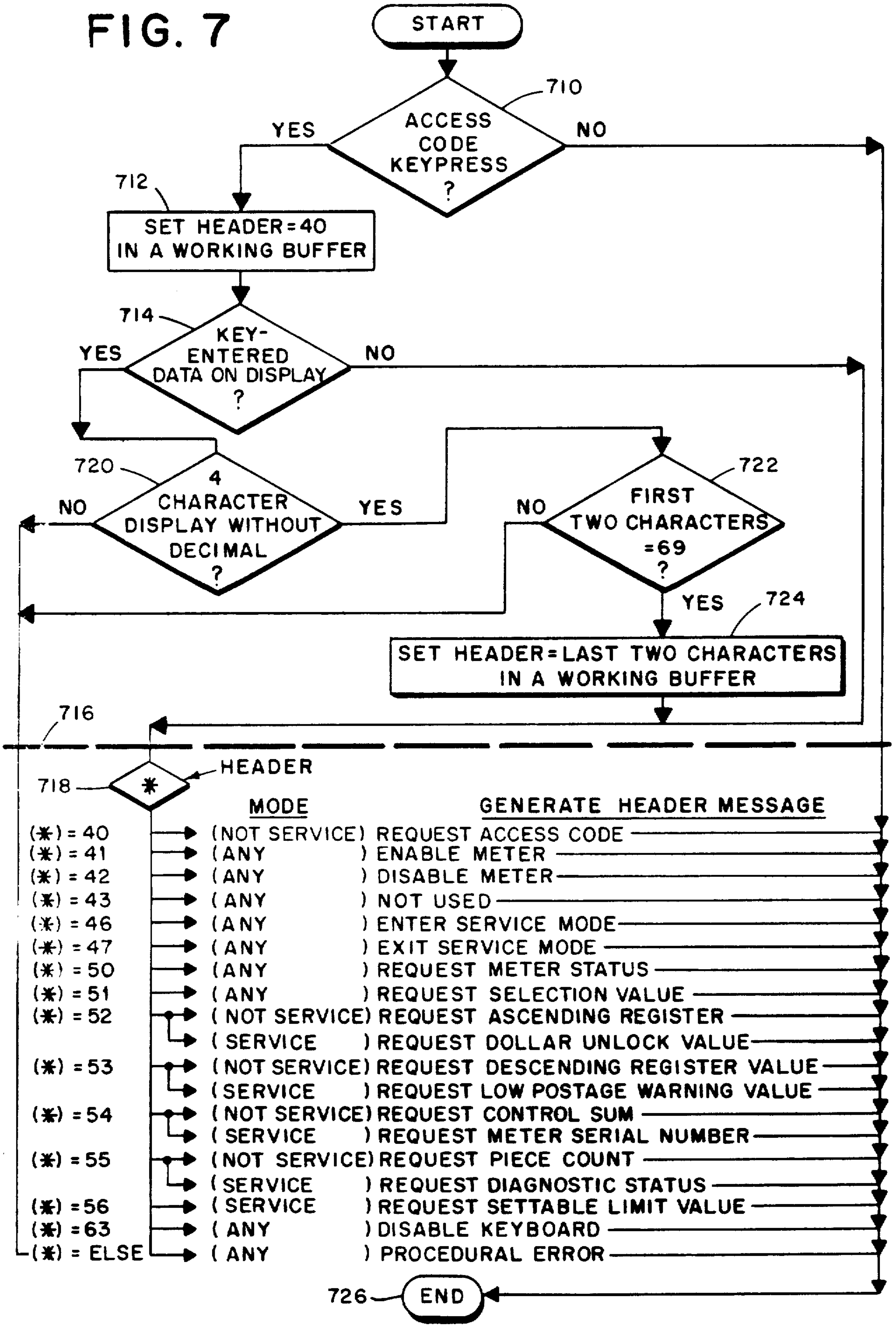
FIG. 7 is a flow chart of the header message logic routine according to the invention.

For the general case of usage of the numerical keys in combination with the access key 170 (FIG. 3) for displaying all of the above referred to information and still further information, reference is made to FIG. 7, wherein the 700 series of numbers are utilized to identify the steps of processing. As shown in FIG. 7, until the access code key is depressed 710, the microprocessor under the direction of the idle loop program continues its idle routine. When the access key is depressed 710, a single byte header message corresponding to the numerical value of "40" is built and stored in an available working buffer 712. If there is no key entered data in the display 714 at this juncture, the microprocessor invokes the header message execution routine 716 shown below the dashed line in FIG. 7 to execute the header message 718. Since the header message corresponds to the numeral 40, a "request access code" message is generated, which message results in the microprocessor invoking a conventional subroutine for building an access code in the display buffer. And, as hereinbefore discussed, the display buffer is copied into the image buffer in bit format for driving the LED display, as a result of which the access code is displayed to the operator, i.e., the code ordinarily used by the operator, for example for calling into Pitney Bowes Data Center, when charging the postal meter with additional postage. On the other hand, after the aforesaid numeral 40 header is generated 712 and set in the available buffer, if there is key entered data is in the display 714 the header will not be executed. Rather, the display buffer will be scanned, and, if the data in the display buffer is not a four character display without a decimal 720, then the microprocessor invokes a conventional sub-routine which generates a "procedural error" message, i.e., a meter status message having a procedural error bit, which message is transferred to the display image buffer to drive the LED display to display the notation "ERR". Similarly, if the display is a four character display without a decimal, but the first two characters 722 are not the numerals "69", the microprocessor invokes the aforesaid sub-routine to generate the procedural error message and display the same error notation. On the other hand, if the first two characters 722, of the four character display without a decimal, are the numerals "69", then, a single byte header message 724 utilizing the last two characters is generated and stored in an available working buffer, whereupon the microprocessor invokes the header message execution routine 716 below the dashed line in FIG. 7 and execute the same to generate a message corresponding to the last two digits.

Upon execution of the header message routine 716 (FIG. 7), if the aforesaid last two digit header message is "40", a "request access code" message is generated, resulting in the display hereinbefore discussed. If the two digit header message is "41" an "enable meter" message is generated, if it is "42" a "meter disable" message is generated, if it is "46" an "enter service mode" message is generated, if it is "47" an "exit service mode" message is generated, if it is "50" a "request status" message is generated, and if it is "51" a "request selection value" message is generated. If it is "52" and the meter is not in the service of operation a "request ascending register" message is generated. On the other hand, if it is "52" and the meter is in the service mode of operation the request ascending register message is interpreted as a "request dollar lock value" message. If the two digit code is "53", "54" or "55" and the meter is not in the service mode of operation, then the "request descending register", "request control sum" or "request piece count" messages will be respectively generated; whereas if it is "53", "54" or "55" and the meter is in the service mode of operation then these same messages will be respectively interpreted as the "request low postage warning value", "request meter serial number" or "request diagnostic status" messages. Further, if it is "56" and the meter is in the service mode of operation the "request settable limit value" message will be generated, if it is "63" the "disable keyboard" message will be generated, and, if the last two digits are any two digits other than one of the foregoing last two digits, then the "procedural error" message will be generated. In each instance, upon generating or otherwise providing the particular message, processing is ended 726, and thereafter the microprocessor invokes a conventional sub-routine which is executed by the microprocessor to cause the performance of the particular operation of the meter which corresponds to the message and to provide a display corresponding to the message. For example, when the message "request access code" and "procedural error" were respectively generated as hereinbefore discussed, an access code and the notation "ERR" were respectively displayed.

To effectuate utilization of the keyboard 22 to initiate data entry functions for which separate keys have not been provided, and to obviate the necessity of entering and end of entry command from the keyboard without providing a separate key therefor, the postal meter/mailing machine is also programmed to permit an operator, usually a factory trained serviceman, to modify or initially store various predetermined values in the mailing machine which effect its operational characteristics. These values include the settable limit value, low postage warning value and dollar unlock value, which are usually modified to comply with customer needs or preferences. According to the invention, for modifying such values the machine is initially put into the service mode of operation as hereinbefore discussed. Having done so it should be noted that since the access code key is not involved with modifying values stored in the meter, the flow chart of FIG. 7 is not hereinafter referred to in the following discussion.

Before modifying the aforesaid values, after putting the postal meter in the service mode of operation, the operator may optionally check the values that are to be modified, by depressing the appropriate key 162, 164 or 166 (FIG. 5) to determine whether or not modificaiton is necessary. Thereafter the operator ordinarily enters the new value to be stored into the keyboard 22, by depressing the appropriate numerical keys 156, which results in the display of the corresponding value, and then depressing the enter amount key 172 (FIG. 3), which results in the storage of the displayed amount and blanking the display. Either before or after entry of the new value, the operator may enter a predetermined combination, having at least one digit, into the keyboard by utilizing the numerical keys 156 (FIG. 5), which results in the display of the corresponding value, and then depressing the enter combination key 173 (FIG. 3), which results in the storage of the combination corresponding to the keyboard entry and blanking of the display. As a result of having entered both the amount and combination, the microprocessor automatically invokes the end of entry program shown in FIG. 8 for processing the entered amount and combination, as if an end of entry command had been received, thereby causing the value stored in the register identified by the combination to be changed to the new value.

Figure 8A:
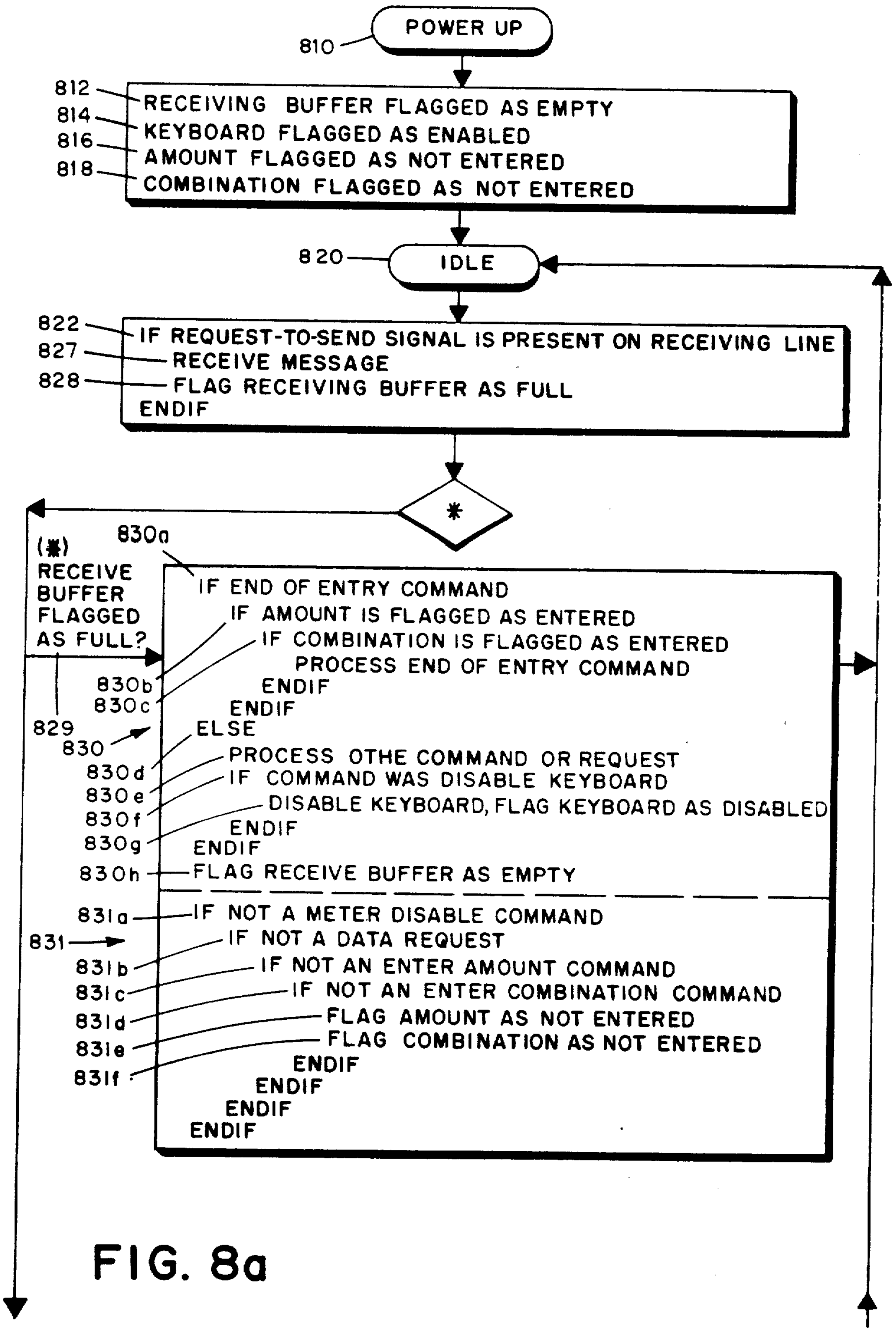
FIG. 8 (including FIGS. 8*a* and 8*b*) is a flow chart of the amount and combination, end of entry, logic routine according to the invention.
Figure 8B:
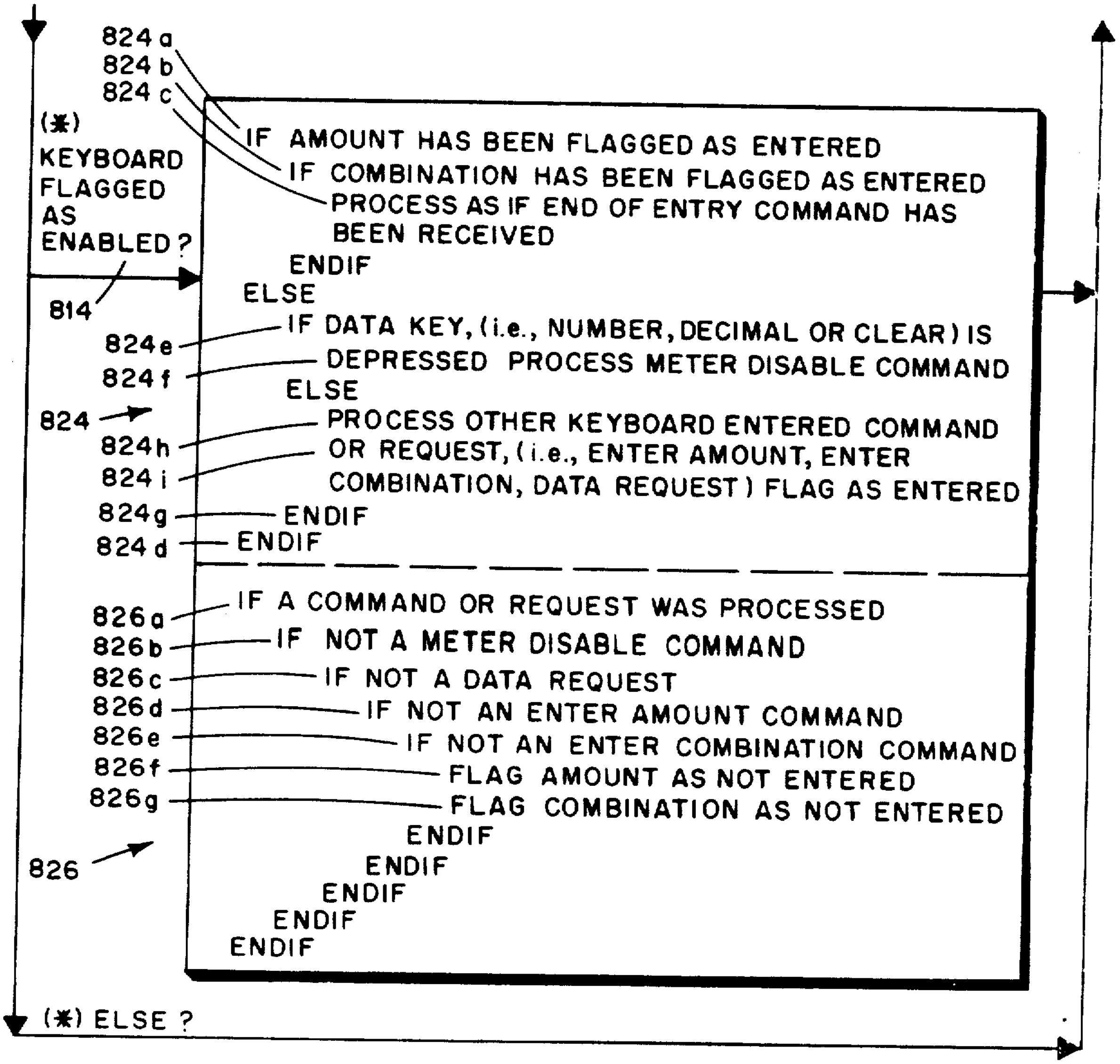

The end of entry program (FIG. 8) is executed by the microprocessor under the control of the appropriate accounting routine. As shown in FIG. 8, after power 810 is applied to the postal meter the receiving buffer is flagged as empty 812, the keyboard is flagged as enabled 814. In addition, the amount and combination working registers of the RAM are flagged as not entered, 816 and 818, in the course of initialization of the postal meter/machine. Under the control of the idle loop program, the microprocessor then searches for executable instruction in the various working buffers of the RAM.

As shown in FIG. 8, wherein the 800 series of numbers are used for identifying the processing steps, processing precedence from idle 820 is given to messages received from external devices, over those that are internally generated. For the purpose of this discussion, it will be assumed until otherwise stated that a request-to-send signal 822 has not been received from any external device since the initialization process was completed, and that the receiving buffer remains flagged as empty 812, the keyboard remains flagged as enabled 814, the amount remains flagged as not entered 816 and the combination remains flagged as not entered 818. Accordingly, messages are processed in accordance with the steps of the process set forth in the lower block 824 (FIG. 8). If the amount has been flagged as entered **824*a*, due to a new value having been entered in the keyboard and the enter amount key having been depressed, and if the combination code has also been flagged as entered 824*b*, due to the appropriate code having been entered in the keyboard and the enter combination key having been depressed, then, the amount and combination code are processed 824*c* as if an end of entry command has been received. On the other hand, if the amount has been flagged as entered 824*a* but the combination has not been so flagged, then, processing is ended 824*d*. If however the amount has not been flagged as entered 824*a* and if a numerical data key is depressed 824*e*, then, the keyed data 824*f* generates a meter disable command. In this connection it should be noted that disabling the meter prevents the same from printing postage, and that the keyboard remains enabled. Referring again to FIG. 8, if the amount has not been flagged as entered 824*a* and a numerical data key is not depressed 824*e*, processing is ended 824*g* unless some other key is depressed 824*h*, in which event the other command or request is processed 824*i***.

After the aforesaid processing is completed, all such processing is additionally subjected to the abort analysis subroutine 826 shown below the dashed line in the lower block 826. As shown in this subroutine 826, if a command or request has been processed above the dashed line **826*a* and if it was not a meter disable command 826*b*, and it was not a keyboard entered data request 826*c* i.e., a message generated as a result of depression of any one of the postage used, postage unused or piece count keys, and it was not an enter amount command 826*d*, and it was not an enter combination command 826*e*, then, the amount 826*f* and combination 826*g* are both flagged as not entered. If however the command or request was processed above the dashed line 826*a* and it was a meter disable command 826*b* processing is ended; or, if it was not a meter disable 826*b* but was a keyed data request 826, then processing is ended; or, if it was neither a meter disable command 826*b* nor a numerically keyed data request 826*c*, but was an enter amount command 826*d*, then, processing is ended; or if it was not a meter disable command 826*b* nor data request 826*c* nor enter amount command 826*d*, but was an enter combination command 826*d*, then, processing is ended. And, in each instance in which processing is ended, the amount and combination, 826*b*, 826*g*** are not flagged as not entered, or, otherwise stated, if one or the other of the amount or combination had been flagged as entered due to prior processing above the dashed line it will remain flagged as entered.

The aforesaid abort analysis subroutine 826 (FIG. 8) is provided to be sure that once the operator commences the process of modifying one of the values stored in the postal meter, and certain other information other than the appropriate information for completing the value modification process is entered into the keyboard before completing the value modification process, then the operator is forced to recommence the value modification process. For example, if after the operator enters an amount, the operator then enters a postage value via the keyboard **824*e*, the meter will be disabled due to a meter disable command being generated and processed 824*f* each time a key is depressed. Such entries will not clear the amount and combination entry flags since a meter disable command was processed 826*b*. However, when the operator depresses the select postage key, the message generated is a select postage command 826*b* not a data request 826*c*, not an enter amount command 826*d* and not an enter combination command 826*e*; as a result of which the amount and combination code will both be flagged as not entered. Thus the previously entered amount will have to be reentered by the operator. On the other hand, it is permissable to interrupt processing the new value/combination code entry sequence for the purpose of displaying values by depressing data request keys. Thus the postage used key may be depressed for displaying the "dollar unlock" value, the postage unused key may be depressed for displaying the "low postage warning" value, and the piece count key may be depressed for displaying the "diagnostic status"; these values, rather than those associated with the name of the key, being displayed since the new value/combination code is entered when the postal meter is in the service mode of operation. Under these circumstances, the amount and combination will not be flagged as not entered, since the depression of such keys results in generating a data request message and processing a data request message 826*a*** results in ending the abort analysis subroutine. Accordingly, a previously entered amount or combination will not be flagged as not entered. Thus, although the postal meter is programmed for forcing the operator to complete the value modification process after having commenced the same, or, otherwise stated, is programmed for preventing the value modification process from being aborted after its commencement, information which is relevant to value modification processing may be displayed after the process has been commenced with respect to any of the values that are ordinarily modified.

At any time in the course of the foregoing procedures the operator of an external device may take control of the meter to transmit a command or message by sending a request-to-send signal. However, the message associated with the signal will not be processed until internal processing then in progress is completed.

As shown in FIG. 8, after idle 820, if there is not a request to send signal 822 on the receiving line nothing is done. If however a request to send signal 822 is on the receiving line, then the message is received 827 and the receive buffer is flagged as full 828. Having flagged the receive buffer as full 828, 829 the message will be processed in the upper block 830 whether or not the keyboard is enabled, due to processing receiving buffer messages taking precedence over processing keyboard entered messages.

As shown in the upper block 830, if the message following the request to send signal is an end of entry command **830*a* and the amount and combination are both flagged as entered 830*b* and 830*c*, then, the amount and combination are processed. However, it should be noted that if the keyboard entry routine hereinbefore discussed was interrupted by a request-to-send signal 822 after entry of the amount and combination via the keyboard, the amount and combination would not be effected, since processing would have already automatically occurred as if an end of entry command had been received, inasmuch as the end of entry message associated with the request-to-send signal 822 will not be processed until the processing then in progress is completed. Accordingly, the incoming end of entry command 830*a* would find both the amount and combination flagged as not entered 830*b* and 830*c***, as a result of which processing of the end of entry command in the upper block diagram would be ended. This would also occur if the external device operator were to consecutively enter the amount and then enter the combination, in any order, unless the operator of the external device initially disables the keyboard. Assuming the external device is equipped to disable the keyboard, the operator of the external device has the option of allowing automatic processing, as previously discussed, as if an end of entry command had been sent, or, preventing such processing until an end of entry command is transmitted.

Referring back to the upper block 830 (FIG. 8) assuming the message following the request-to-send signal 822 is not an end of entry command, but is something else **830*d*, that request or command is processed 830*e*. And if the message is a disable keyboard command 830*f*, the keyboard is flagged as not enabled 830*g*. In any event, after processing the request or command received from the external device, processing is ended and the receiving buffer is flagged as empty 830*h***.

As discussed in connection with processing the keyboard entries, commands and messages from the external device are also subjected to an abort analysis subroutine 831, in this instance as shown in the upper block 830. As shown below the dashed line 831, if a command or request was not a meter disable command **830*a*, not a numerical data request 830*b*, not an enter amount command 830*c* and not an enter combination command 830*d*, then, both the amount 830*e* and combination 830*f* are flagged as not entered. On the other hand, if the request or command was a meter disable command 830*a*, or, if it was not, but was a data request 830*b*; or, if it was neither a meter disable command 830*c* nor a data request 830*d* but was an enter amount command 830*e*; or if it was not a meter disable command 830*a* nor data request 830*b* nor enter amount command 830*c*, but was an enter combination command 830*d*; then, in each instance, processing below the dashed line is ended and returns to idle 820**.

The main difference between the processing steps involved in modifying the values in the registers via the external device rather than via keyboard entries, is that an end of entry command **830*a* must be sent from the external device to commence processing the amount and combination code if the operator of the external device initially transmitted a disable keyboard command; whereas, as shown in the lower block 824**, an end of entry command need not be initiated by the operator to commence processing the amount and combination code data, rather it is automatically processed when the last of the two (amount or combination) are entered. Thus the external operator has a choice of methodology which is unavailable to the keyboard operator.

Assuming the operator of the external device sends a disable keyboard command, it must be sent prior to entering either the amount or combination. For example, assuming the amount has been entered **830*b* but the combination has not been entered 830*c* and a disable keyboard command 831*a* has not as yet been sent by the operator of the external device, if at this time a request to send signal 822 is sent, followed by a disable keyboard command 826, since this is not an end of entry command 830 it would be processed by the upper block 830 as any other command or request 830*d* and, in addition, the keyboard would be flagged as not enabled 830*g*. However, since all processing above the dashed line of the upper block 830 is analyzed below the dashed line, and since the keyboard disable command is not a meter disable command 831*a*, and not a data request 830*b*, and not an enter amount command 830*c* and not an enter combination command 830*d*; the amount 830*e* and combination 830*e*** will both be flagged as not entered. As a result, the previously entered amount would be cleared.

Assuming the external device operator chooses to disable the keyboard before entering the amount and combination, since he wants to avoid automatic processing, then, after such processing, unless the external operator transmits an enable keyboard command, the keyboard will remain disabled. If this state of affairs is not intended, the keyboard operator can cure the problem by turning the power switch "off" and then "on" again, as a result of which the keyboard will be flagged as enabled 814 in the course of the initialization process.

The aforesaid discussion concerning the end of entry processing is based on the assumption that the postal meter is in the service mode of operation. When the postal meter is in the non-service mode of operation, the amount and combination keys 172 and 714 are utilized in the same fashion to effectuate modifying the amount stored in the postage unused register of the RAM. And, processing any message generated by depression of the amount and combination keys 172 and 173 is in all respects the same as is hereinbefore discussed. In addition, the same may be said for processing messages generated by the external device. And all other remarks hereinbefore made with regard to utilization of other keys of the keyboard, and processing messages from the external device other than those pertaining to entry of the amount and combination, apply with equal force to utilization of the meter in the non-service mode. However, it is critical to the security of the postal meter that the combination code used for modifying the value stored in the postage unused register not be made available to anyone other than authorized users of the postal meter. Therefore the code is obtained from the Data Center by following the steps of depressing the access code key 170, which results in the display of a code other than the combination code, and then calling this code into the appropriate Data Center, as hereinbefore discussed, along with the serial number of the postal meter/machine and the amount which is to be added to the postage unused register, to obtain from the Data Center the then current combination code which must be used for entry in order to effectuate modification of the value stored in the postage unused register.

Since it is critical to the security of the postal meter to be sure that the serial number cannot be modified except by authorized personnel, any modification of the serial number is ordinarily undertaken in the course manufacture of the machine and, in any event, before the machine is placed in service. For preventing the serial number from being modified by unauthorized personnel, the above discussed modification procedure can only be used for modifying the serial number if it is stored in modifiable form. For example, assuming the postal meter/mailing machine does not have a serial number or has a serial number which is to be modified; the foregoing procedure may be followed, utilizing as the new value, a serial number having at least one digit prefixed by a "zero" digit, for either initial entry or any modification of an unlocked serial number. However, at such time as it is desirable to fix the serial number of the postal meter/mailing machine, the operator repeats the aforesaid modification procedure another time, utilizing the next previously entered serial number prefixed by a "one" digit rather than a "zero" digit, whereupon the microprocessor invokes a conventional subroutine which locks the next previously entered combination in place in the serial number register.

It is known and understood that the terms postage meter and postal meter, as used herein, refer to the general definition of a device for the imprinting of a defined unit value for governmental or private carrier parcel, evelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as a means to provide unit value pricing for individual parcels, including acounting and printing functions.

A more detailed description of the programs hereinbefore discussed is disclosed in the program listing, located in the patented file, describing in detail all of the various routines incorporated in, and used in the operation of, the postal meter/mailing machine.

While the inventions disclosed herein have been described with reference to a simple embodiment thereof, it will be apparent to those skilled in the art that variations and modifications may be made therein without departing from the spirit and scope of the same. Accordingly, it is intended in the following claims to cover each such variation and modification as falls within the true spirit and scope of the claimed inventions.

What is claimed is:

1. In a postal meter constructed and arranged to be connected to a source of supply of power for energization of the meter, wherein said meter has a cover including a hinged lid which may be opened by an operator for access thereunder, wherein said meter has printing means including means for printing postage values and a selected date, and wherein the meter has means for displaying a plurality of segments, means for entering data, computer means electrically connected to all of the aforesaid means and programmed for processing data for controlling the operation thereof, and means under the lid and connected to the printing means for selecting one of a plurality of dates, an improvement for reminding an operator of the postal meter to check the selected date, the improvement comprising:

(a) said computer means programmed for causing said displaying means to start displaying and flashing a predetermined code in response to energization of said postal meter, said code including at least one unique check date indicator segment;

(b) said data entering means including a first depressible key for entering data into said computer means, said first key being located under the lid and thus in sufficiently close proximity to said date selecting means to remind an operator to check the selected date; and (c) said computer means programmed for causing said displaying means to stop displaying said at least one segment on display in response to the depression of said first key.

2. The improvement according to claim 1, wherein said data entering means includes means for receiving data from an external device, and said computer means programmed for causing said displaying means to stop displaying said at least one segment on display in response to receiving data simulating the depression of said first key.

3. The improvement according to claim 1, wherein said data entering means includes means for receiving data from an external device, and said computer means programmed for causing said displaying means to stop flashing said at least one segment on display in response to receiving data simulating the depression of said first key.

4. The improvement according to claim 1, wherein said computer means is programmed for disabling said printing means in response to the energization of said postal meter.

5. The improvement according to claim 4, wherein said computer means is programmed for causing said printing means to be enabled in response to the depression of said first key.

6. The improvement according to claim 1, wherein said computer means is programmed for causing said displaying means to start displaying a postage setting comprising a plurality of segments in response to energization of said postal meter, and said computer means is programmed for causing said displaying means to start flashing said postage setting on display in response to energization of said postal meter.

7. The improvement according to claim 6, wherein said computer means is programmed for causing said displaying means to stop flashing said postage setting on display in response to the depression of said first key.

8. The improvement according to claim 6, wherein said data entering means includes means for receiving data from an external device, and said computer means programmed for causing said displaying means to stop flashing said postage setting on display in response receiving data simulating the depression of said first key.

9. In a postal meter constructed and arranged to be connected to a source of supply of power for energization of the meter, wherein said meter has a cover including a hinged lid which may be opened by an operator for access thereunder, wherein said meter has printing means including means for printing postage values and a selected date, wherein said meter has means for displaying a plurality of segments, means for entering data, computer means electrically connected to all of the aforesaid means and programmed for processing data for controlling the operation thereof, and wherein said postal meter has means under the lid and connected to the printing means for selecting one of a plurality of dates, a method of reminding an operator of the postal meter to check the selected date, the method comprising the steps of:

(a) programming said computer means for causing said displaying means to start displaying and flashing a predetermined code including at least one unique check date indicator segment in response to the energization of said postal meter;

(b) providing said data entering means with a first depressible key for entering data into said computer means and locating said first key under the lid and thus in sufficiently close proximity to the date selecting means to remind an operator to check the selected date; and (c) programming said computer means for causing said displaying means to stop displaying said at least one segment on display in response to the depression of said first key.

10. The method according to claim 9, including the steps of entering data from an external device, and programming said computer means for causing said displaying means to stop displaying said at least one segment on display in response to entry from an external device of data simulating the depression of said first key.

11. The method according to claim 9, including the steps of entering data from an external device, and programming said computer means for causing said displaying means to stop flashing said at least one segment on display in response to entry from an external device of data simulating the depression of said first key.

12. The method according to claim 9, including the step of programming said computer means for disabling said printing means in response to the energization of said postal meter.

13. The method according to claim 12, including the step of programming said said computer means for causing said printing means to be enabled in response to the depression of said first key.

14. The method according to claim 9, including the steps of programming said computer means for causing said displaying means to start displaying a postage setting in response to energization of said postal meter, and programming said computer means for causing said displaying means to start flashing said postage setting on display in response to energization of said postal meter.

15. The method according to claim 14, including the step of programming said computer means for causing said displaying means to stop intermittently flashing said postage setting on display in response to the depression of said first key.

16. The method according to claim 14, including the step of programming said computer means for causing said displaying means to stop flashing said postage setting on display in response entry from an external device of data simulating the depression of said first key.

* * * * *